Patented Oct. 23, 1951

2,572,563

UNITED STATES PATENT OFFICE 2,572,563

AROMATIC COMPOSITIONS AND PROCESS OF TREATING LACTONE MATERIAL TO PREPARE THEM

John C. Hillyer and James T. Edmonds, Bartlesville, Okla., assignors to Phillips Petroleum Company, a corporation of Delaware No Drawing. Application November 21, 1949, Serial No. 128,676

7 Claims. (Cl. 260—344)

This invention relates to the manufacture of a valuable chemical intermediate. In one embodiment this invention relates to the utilization of a condensate of furfural, water and 1,3-butadiene in the manufacture of a chemical intermediate containing an aromatic ring and a single side chain. In still another embodiment this invention relates to the utilization of a by-product material of an extractive distillation process employing furfural, in the manufacture of a new and novel composition.

An object of this invention is to provide a new and novel composition.

Another object is to provide a process for the manufacture of a new and novel composition.

Another object is to provide for the manufacture of a composition containing an aromatic ring and a single side chain, from a selected lactone.

Another object is to provide for the manufacture of a composition containing an aromatic ring and a single side chain from a by-product material of an extractive distillation employing furfural as a selective solvent in the recovery of butadiene from a butadiene-butene hydrocarbon mixture.

Other objects will be apparent to one skilled in the art from the accompanying discussion and disclosure.

In accordance with one embodiment of this invention a new composition containing an aromatic ring and a single side chain and having special utility as an odorizing agent and chemical intermediate, is produced from furfural, butadiene and water by first condensing these three reactants to form a lactone, and then thermally treating the lactone so produced, in the presence of palladium as a catalyst, under specified conversion conditions of time and temperature. In the condensation reaction above referred to, one molecule each of butadiene, water and furfural react together to form a lactone having the empirical formula $C_9H_{12}O_3$, the resulting condensation reaction product being a solid crystal material which will be discussed in more detail hereafter.

The new composition of our invention contains an aromatic ring and a single side chain; it is insoluble in water, and soluble in ethanol, acetone and aqueous alkali, the latter solubility definitely indicating it to be acidic; it has a density, $D_{25}^{25}$, of 1.152, and a refractive index, $N_D^{24}$, of 1.530.

Our composition has an odor resembling that of hyacinths, and can be especially applied as an odorizing agent, being particularly useful in the perfume industry and in the manufacture of artificially odorized products.

The aromatic structure of our composition, together with its single side-chain, makes it especially valuable as a chemical intermediate in various chemical syntheses.

In a preferred embodiment, we conduct the process of our invention by admixing the lactone with a palladium-on-activated-charcoal catalyst, and heating the resulting reaction admixture to a temperature in the range of from 300 to 450° F. for a time within the limits of from 0.5 to 5 hours. The amount of palladium-on-charcoal catalyst employed is generally from 5–20 per cent based on the weight of the resulting reaction admixture, and it contains preferably from 1 to 20 per cent by weight of palladium.

The palladium catalyst can be employed without being supported on charcoal, when desired, and in this case it is employed in a proportion within the range of about 0.05 to 4.0 per cent based on the weight of the total reaction mixture.

Generally we have prepared the lactone starting material above referred to by the interaction of butadiene, furfural, and water. This lactone material is a condensation product of butadiene, water, and furfural. A preferred procedure for the preparation of this lactone material is illustrated with a reaction system comprising furfural and from 1–50 per cent water, and 3–50 per cent butadiene, based on the weight of furfural. The reactant materials for such a system are charged to an autoclave and maintained at a temperature generally within the range of from about 200–300° F. for a reaction time from about 5 to about 125 hours. Unchanged reactants and any butadiene polymer are removed from the resulting reaction product and the higher boiling portion is fractionated under reduced pressure, i. e., preferably below 5 mm. of mercury, to recover the lactone starting material of our invention.

Higher temperatures, i. e., above about 300° F., accelerate undesirable secondary condensations during the lactone preparation step, above described, to an extent that they generally should be avoided. While a good quality lactone product can be obtained at relatively low temperature, operations below about 160° F. usually require substantially extended time. Pressures are, in general, not critical, and while effective conversion is usually obtained at the pressures normally developed at the operating temperature, they may be varied to any desired level such as by admission of nitrogen or other inert gas. It is preferred to have the furfural-butadiene-water reactants present in the reaction zone primarily in liquid phase. Distillation of the residual lactone-containing product under reduced pressure conditions below about 5 mm. of mercury absolute, is preferred, since substantial losses through secondary condensations, pyrolytic decomposition, and the like, usually result from the higher temperatures required when employing fractionation at higher distillation pressures, particularly a pressure as high as 1 atmosphere.

The lactone starting material can be obtained as a by-product of an extractive distillation process involving the use of furfural as a selective solvent in the separation of butadiene from a butadiene-butene hydrocarbon mixture undergoing fractional distillation in a distillation column. In such a process the butadiene-butene stream is contacted with furfural generally containing from 4–6 per cent water. Temperatures in various parts of the extractive distillation system range up to about 325° F., and the total contact time of butadiene, water, and furfural in the extractive distillation column is sufficiently long to provide for some appreciable "side reaction," or condensation, of furfural with water and butadiene, and the concomitant formation of some lactone by-product. The magnitude of such extractive distillation operations is such that large volumes of furfural are in constant circulation in the system, and thus even a low conversion of furfural to the lactone provides large amounts of the lactone product that can be utilized as a starting material in the process of our invention.

In the separation of butadiene from a butane stream in accordance with the extractive distillation procedure above referred to, it is generally customary to divert a small proportion, usually about 1 or 2 per cent of the circulating furfural stream, to a furfural rerun system, generally a steam or vacuum re-distillation system, for the purpose of removing by-product furfural polymers. In such a rerun system, the furfural-butadiene-water reaction product is separated from the furfural, as a part of a tarry bottoms product, containing large amounts of resinous furfural polymer together with certain aldehydic products of furfural-butadiene reaction, and the lactone condensate that we utilize as a starting material in the practice of our invention. Separation of this latter lactone material from the tar can be effected by a high vacuum distillation, generally at about 1 mm. pressure, or less, while employing a kettle temperature preferably in the range of from 150–250° F. The lactone condensate fraction obtained in this manner is free from furfural polymer and from at least a major proportion of aldehyde by-product, and is generally at least partially crystalline.

Steam distillation, when used in the removal of tar from the furfural side stream, provides large amounts of water condensate, which collect with the bottoms product. The aqueous phase thus formed carries in solution a large proportion of the lactone by-product, which can be recovered by distillation.

It is a feature of our invention that it is unnecessary to utilize the lactone reactant in a high state of purity, thus eliminating the cost of a final purification that would otherwise be required. We have found that we can use a crude lactone-containing fraction recovered as a product of condensation of butadiene, water, and furfural, conducted under preparation conditions already discussed herein, or effected as a side reaction in an extractive distillation method of the type already discussed. This feature is particularly advantageous when utilizing the by-product material obtained from the furfural purification step already described. The tarry phase from the extractive distillation process, when distilled under reduced pressure, yields the lactone product together with some aldehydic materials, and these products can be readily separated to isolate the lactone in any desired purity. However, since the aldehydic by-product materials present in such a lactone-containing fraction do not enter into the reaction of our invention, and since they do not affect the reaction in any way, it is advantageous, from an economics standpoint, to permit their presence, thereby eliminating purification costs.

Recovery of a lactone-containing fraction from the steam condensate, when steam distillation is employed in the furfural rerun step, may be effected by evaporation of the water, and the residual product may be utilized as our starting material. However, when desired, the residual product from such steam-condensate distillation may be further purified by means of solvent extraction, with a selective solvent such as acetone for example, to remove the lactone product in any desired degree of purity.

Our invention is illustrated by the following examples. The reactants, their proportions, and other specific ingredients are presented as being typical and should not be construed to limit the invention unduly.

*Example 1*

Freshly steam distilled furfural containing five per cent by weight of water was charged to a steel reaction vessel. Sufficient 1,3-butadiene was added to give a butadiene concentration of 4.0 per cent in the reaction mixture. The composition of the charge material was

| | Parts by weight |
|---|---|
| Furfural | 91.2 |
| Butadiene | 4.0 |
| Water | 4.8 |

The temperature within the reaction vessel was maintained at 260° F. for 70 hours. The reaction product was then transferred to a specially designed distilling flask and stripped of water, unreacted furfural, and butadiene under a pressure of from two to five mm. of mercury. A residue containing some furfural, and the furfural-butadiene and furfural-butadiene-water condensation products, was transferred to a flask bearing a Vigreaux column and fractionated at pressures in the range 0.5–0.2 mm. of mercury. Initial overhead distillation product was aldehydic in nature. A subsequent, i. e. heavier fraction, was obtained comprising a mixture of white crystals and a red viscous liquid. The crystals which appeared in this fraction had a melting point (crude) of 245° F. to 250° F., a melting point after crystallization of 276° F. and a acidity of 0.0 per cent, an aldehyde content of 0.0 per cent, and a molecular weight of about 189. They were insoluble in petane and soluble in acetone, water, benzene, methanol, cyclohexane and carbon disulfide.

In the preparation of large quantities of reaction product from butadiene, water, and furfural, in accordance with the procedure above described, the reddish oil, containing the white crystalline product, after standing for a prolonger period of several months contained an increased concentration of white crystals. Fourteen parts by weight of this material boiling at 260–290° F. at 0.5 mm. was redistilled at 0.5 mm. in a packed, silvered column. Approximately 1 part of the light reaction product was separated followed by 2 parts of a white crystalline solid. The remaining overhead product was a heavy oil. The residue was transferred to a very small flask, but no further crystalline products could be distilled and no crystals separated from the oily overhead material.

The crystalline material was found to melt at 267–698° F. It had a neutralization equivalent of 192. An initial determination of the molecular weight, determined in benzene by the freezing point, was 180, though difficulty was experienced with low solubility. Determination by the Rast camphor method gave a value of 158. The material is soluble in water, alcohol, and dilute sodium hydroxide solution. Preliminary carbon and hydogen analyses gave C, 64.18 per cent; H, 7.38 per cent; and O, by difference 28.44 per cent. The neutralization equivalent indicates the presence of one potential carboxyl group per molecule.

Further experimental work, not related herein in detail, established the empirical formula of this crystalline product to be $C_9H_{12}O_3$.

Example II

Fifty parts by weight of furfural was agitated in a closed reactor with ten parts by weight of butadiene and five parts of water for 100 hours at about 300° F., air being expelled from the reactor by evaporation of a small excess of butadiene included in the charge. Pressure during the reaction period was about 350 p. s. i. g. At the end of the time, pressure was released and unreacted butadiene allowed to evaporate. The reaction mixture was subjected to distillation under reduced pressure. The first components removed were water and 4-vinyl-1-cyclohexene. The bulk of the distillate was unreacted furfural. When the residue was reduced to a fairly small volume, 2,3,4,5 - bis($\Delta$2-butenylene)-tetrahydrofuran, resulting from the reaction of furfural with butadiene alone, distilled at about 235° F., the pressure for this part of the distillation being reduced to about 1 mm. Hg. A reddish yellow oil was then distilled, forming a semi-solid mass in the receiver which became solid and crystalline upon cooling and standing. This material distilled in the range 250 to 300° F. at 0.5 mm. This material was predominantly the lactone of Example I having the empirical formula $C_9H_{12}O_3$.

A portion of a lactone material produced as described immediately above, was placed in a glass flask with 5 per cent (based on weight of total reaction mixture) of a palladium-on-activated charcoal catalyst containing 10 weight per cent palladium. The flask was attached to a condenser and receiver and the reaction mixture was maintained at a temperature of about 395° F. Some water distilled, and a trace of gas was produced. After two hours, the reaction mixture was cooled and dissolved in ethanol; the catalyst was removed by filtration. The ethanol solvent was removed by distillation and a residual product was obtained in a yield of about 60 per cent based on the lactone starting material. The product was a viscous oil, at reaction temperature, becoming glassy on cooling, and almost colorless. It possessed a characteristic odor resembling hyacinths.

Upon further examination the product composition was found to have a density, $D_{25}^{25}$, of 1.152, a refractive index, $N_D^{24}$, of 1.530, and to be soluble in alcohol, acetone, and 5 per cent aqueous sodium hydroxide. The product was found to be insoluble in water.

Example III

Ten parts by weight of the product produced and recovered in accordance with the procedure of Example II was oxidized with 60 parts of potassium permanganate in 200 volumes of water at 100° C. Manganese dioxide produced during the oxidation was separated from the resulting oxidation reaction mixture. The reaction mixture thus free of manganese dioxide was acidified and a quantity of white crystalline material was formed. This crystalline product was recrystallized from hot water to produce crystals melting at 121–122° C. A melting point was taken on a mixture of the crystals thus produced with benzoic acid (melting point 121.7 C.) and no lower melting point was observed, thereby identifying the product as benzoic acid and establishing the structure of the product as one containing an aromatic ring with only one side chain.

As will be evident to those skilled in the art, various modifications of this invention can be made, or followed, in the light of the foregoing disclosure and discussion, without departing from the spirit or scope of the disclosure or from the scope of the claims.

We claim:

1. A process for the conversion of a lactone prepared by the interreaction of 1,3-butadiene with furfural and water and having the empirical formula $C_9H_{12}O_3$, to a composition containing an aromatic ring and a single side chain, comprising contacting said lactone with from 0.05 to 4.0 weight per cent palladium as a catalyst based on the total reaction mixture, at a temperature within the limits of 300 to 450° F. and for a reaction time within the limits of 0.5 to 5 hours, and recovering said composition as a product of the process.

2. A process for the conversion of a lactone prepared by the interreaction of 1,3-butadiene with furfural and water and having the empirical formula $C_9H_{12}O_3$ to a composition containing an aromatic ring and a single side chain, comprising contacting said lactone with from 5 to 20 per cent by weight of palladium-on-chaircoal as a catalyst based on the total reaction mixture, at a temperature within the limits of 300 to 450° F. and for a reaction time within the limits of 0.5 to 5 hours, said palladium-on-charcoal containing from 1 to 20 per cent by weight palladium, and recovering said composition as a product of the process.

3. A process for the manufacture of a composition containing an aromatic ring and a single side chain, comprising introducing butadiene, water, and furfural into a reaction zone to provide a resulting admixture containing from 3 to 50 per cent butadiene and from 1 to 30 per cent water based on the weight of furfural, maintaining the resulting admixture at a temperature within the limits of 160 and 325° F., for a period of from 5 to 125 hours, recovering a product fraction from the resulting reaction mixture containing a lactone having an empirical formula $C_9H_{12}O_3$, contacting the resulting lactone-containing fraction with from 5 to 20 per cent palladium-on-activated charcoal as a catalyst based on the weight of the total reaction mixture, at a temperature within the limits of 300 to 450° F. and for a reaction time within the limits of 0.5 to 5 hours, said palladium-on-charcoal containing from 1 to 20 per cent by weight of palladium, and recovering said composition as a product of the process.

4. A composition containing an aromatic ring and a single side chain and characterized by a density, $D_{25}^{25}$, of 1.152 and a refractive index, $N_D^{24}$, of 1.530, and being soluble in ethanol, acetone and aqueous alkali.

5. A process for the utilization of a by-product material from an extractive distillation process wherein furfural is employed as a selective solvent under non-anhydrous conditions in the separation of butadiene from a butadiene-butene hydrocarbon mixture, in the manufacture of a composition containing an aromatic ring and a single side chain, comprising diverting a side stream of furfural from such an extractive distillation system to a furfural purification system and therein separating furfural of high purity and a tarry residual byproduct formed as an impurity during said extractive distillation; vacuum distilling said tarry residue and separating a residual tar product and an overhead product containing a lactone characterized by the empirical formula $C_9H_{12}O_3$, contacting the resulting lactone-containing fraction with palladium as a catalyst and present in a proportion of from 0.05 to 4.0 per cent by weight based on the resulting reaction mixture, at a temperature within the range of from 300 to 450° F., and for a contact time within the limits of 0.5 to 5 hours, and recovering said composition as a product of the process.

6. A process for the utilization of a by-product material from an extractive distillation process wherein furfural is employed as a selective solvent under non-anhydrous conditions in the separation of butadiene from a butadiene-butene hydrocarbon mixture, in the manufacture of a composition containing an aromatic ring and a single side chain, comprising removing water from a steam condensate, formed during the steam distillation of furfural previously utilized as a solvent in such an extractive distillation, separating from a resulting residual steam condensate a light fraction containing a lactone having the empirical formula $C_9H_{12}O_3$, contacting the resulting lactone-containing fraction with palladium as a catalyst and present in a proportion of from 0.05 to 4.0 per cent by weight based on the total reaction mixture, at a temperature within the range of from 300 to 450° F. and for a contact time within the limits of 0.5 to 5 hours, and recovering said composition as a product of the process.

7. A process for the manufacture of a composition containing an aromatic ring and a single side chain, comprising admixing a lactone-containing fraction described hereafter with from 0.05 to 4.0 weight per cent palladium as a catalyst based on the total reaction mixture, maintaining the resulting admixture at a temperature within the limits of 300 and 450° F. for a period within the limits of 0.5 and 5 hours, and recovering said composition as a product of the process; said lactone-containing fraction having a boiling range within the limits of 250 and 300° F. as measured at an absolute pressure of 0.5 mm. Hg. and obtained as a product of condensation of butadiene, water, and furfural at a temperature within the limits of 160 and 325° F. for a period of from 5 to 125 hours.

JOHN C. HILLYER.
JAMES T. EDMONDS.

REFERENCES CITED

The following references are of record in the file of this patent:

UNITED STATES PATENTS

| Number | Name | Date |
|---|---|---|
| 2,372,668 | Hackmuth | Apr. 3, 1945 |
| 2,416,500 | Searth | Feb. 25, 1947 |
| 2,419,039 | Searth | Apr. 15, 1947 |

OTHER REFERENCES

Dunlop "Ind. & Eng. Chem.," vol. 40, pp. 204–209 (1948).

Fischer et al., Beilstein (Handbuch, 4th ed.) vol. 7, pp. 304–305 (1925).

Franke et al., Beilstein (Handbuch, 4th ed., 2nd Suppl.) vol. 7, p. 236 (1948).